Sept. 4, 1951  D. M. POOLE  2,566,961
PRESSURE CONTROL FOR THRUST NOZZLES FOR TURBINES
Filed April 15, 1944
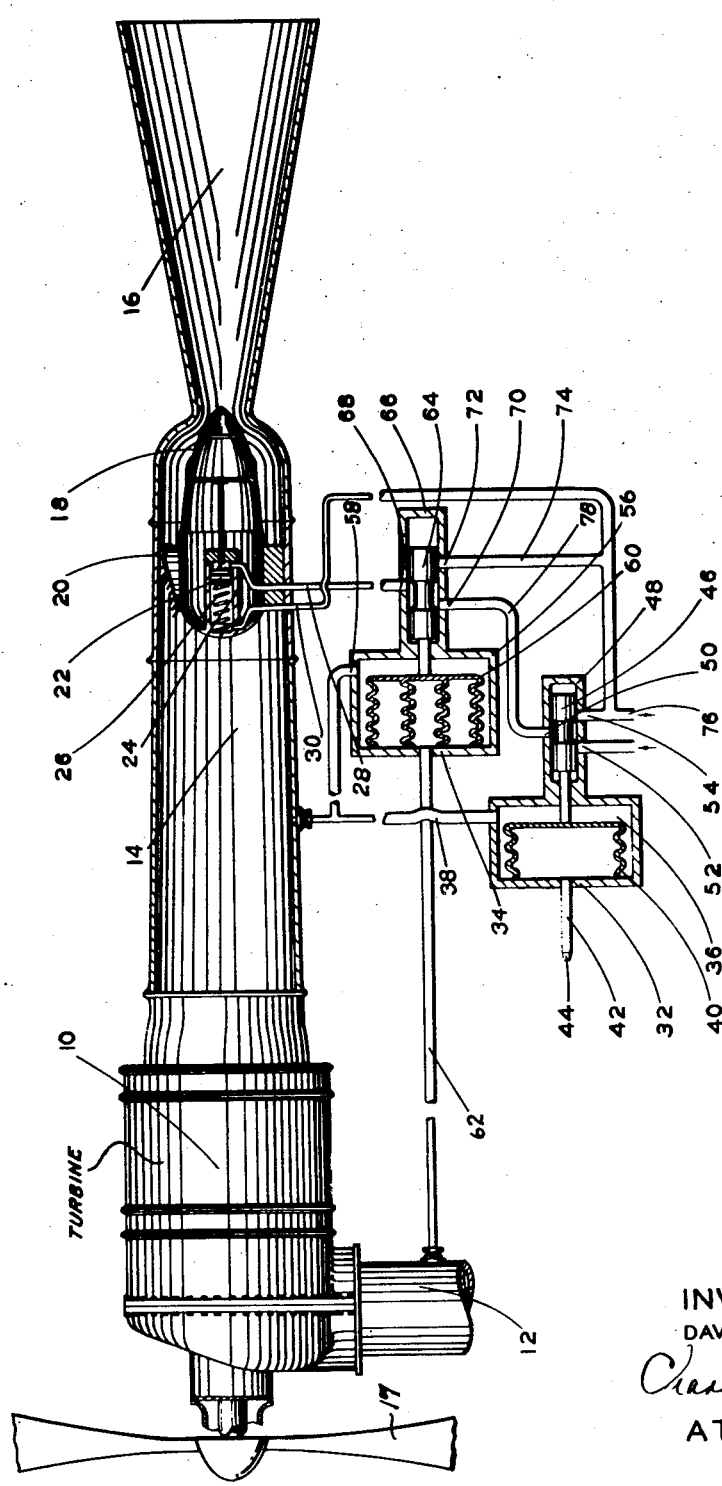
INVENTOR
DAVID M. POOLE
ATTORNEY Patented Sept. 4, 1951

2,566,961

UNITED STATES PATENT OFFICE 2,566,961

PRESSURE CONTROL FOR THRUST NOZZLES FOR TURBINES

David M. Poole, Summit, N. J., assignor to United Aircraft Corporation, East Hartford, Conn., a corporation of Delaware Application April 15, 1944, Serial No. 531,309

10 Claims. (Cl. 60—35.6)

1

This invention relates to pressure controls for a turbine.

In aircraft power plants in which a turbine drives the propeller and the turbine exhaust is discharged as a jet for added propulsive thrust, the nozzle may be adjustable to control the back pressure on the turbine and thus to proportion the total power between the propeller and the jet. A feature of this invention is the automatic control of the nozzle to maintain predetermined operation characteristics in the turbine.

In some turbine installations the turbine is constructed to operate favorably under constant operation characteristics, such as a constant pressure ratio, or a constant pressure drop, between inlet and discharge pressures. Another feature of this invention is the automatic control of the back pressure in the turbine to maintain constant operation characteristics independently of inlet pressure or nozzle discharge pressure.

At lower power or in cruising, if the back pressure is maintained at a constant ratio to the inlet pressure, the back pressure may be so low that the gas discharges from the nozzle at a rate less than the forward motion of the vehicle. In this event, the jet absorbs power instead of producing a propulsive thrust. Another feature of this invention is the control of the nozzle so that under certain conditions the back pressure on the turbine will be equal to the sum of the static atmospheric pressure and the dynamic pressure resulting from the vehicle movement.

An object of the invention is to interconnect the automatic controls for the nozzle so that, under normal conditions a constant pressure ratio is maintained across the turbine. However, when the control attempts to produce a back pressure lower than the sum of the atmospheric pressure and the dynamic pressure resulting from vehicle movement, the nozzle is then adjusted as a function of the atmospheric and dynamic pressures.

Other objects and advantages will be apparent from the specification and claims, and from the accompanying drawing which illustrates what is now considered to be a preferred embodiment of the invention.

The figure is an elevation of the device with the thrust nozzle in section, and showing the arrangements of the controls on a larger scale.

The turbine 10 has an inlet duct 12 and an exhaust duct 14 terminating in a nozzle 16 which is adjustable to control its cross section area and thus adjust the pressure drop through the nozzle. The turbine may be driven by hot gas under pressure provided from any suitable source, and may drive a propulsion means such as propeller 17.

The nozzle is adjusted by a cone 18 which is movable within a faired housing 20 positioned within the exhaust duct. The cone may be adjusted hydraulically by means of a piston 22 connected to the cone and sliding in a cylinder 24 within the housing. Fluid is admitted to the rearward end of the cylinder to move the cone in a direction to open the nozzle. A fluid inlet duct 26 admits fluid under pressure to the rearward end of the cylinder and a duct 30 permits the escape of leakage fluid from the other end of the cylinder.

The nozzle adjustment is controlled by two controlling devices 32 and 34 arranged in series. In normal operation, the device 34 controls the nozzle and is responsive to the pressures in the intake and exhaust ducts of the turbine to maintain constant an operation characteristic. In the arrangement shown, the device 34 maintains a predetermined pressure ratio between the turbine inlet pressure and the exhaust pressure. Under certain conditions the exhaust pressure, if the nozzle were controlled only by device 34, might be less than the atmospheric pressure plus the ram pressure resulting from the forward movement of the vehicle. If this occurs, control device 32 becomes operative, thereby preventing the pressure in the exhaust duct from becoming so low that the gases will be discharged from the nozzle at a velocity less than the forward motion of the vehicle.

Control device 32 may include a chamber 36 which is connected to the exhaust duct by a conduit 38. Within this chamber is a bellows 40, the interior of which is under a pressure equal to the atmospheric pressure added to ram pressure as indicated by a conduit 42 having a forwardly directed end 44. The bellows is connected to a servo motor, including a valve 46 sliding in a casing 48 forming a part of chamber 36. Motion of valve 46 within the casing, as a result of changes in the pressures acting on the bellows, alternately connects an outlet port 50 to an inlet port 52, connected to a source of fluid under pressure, and a vent port 54.

The device 34 is similar in construction and includes a chamber 56 connected by a conduit 58 to the exhaust duct of the turbine. Within this chamber is a double bellows 60, the inner of which is connected by a conduit 62 to the inlet duct for the turbine. This inner bellows is surrounded by a sealed bellows, the pressure of which is such that the motion of the end plate of the bellows will have the desired characteristic. If the bellows is evacuated, the motion of the end plate will be proportional to the pressure ratio between inlet and exhaust pressures.

A valve 64 is connected to the bellows 60 and slides in a casing 66. The valve alternately connects an outlet port 68 to an inlet port 70 or to a vent port 72, the latter being connected by a conduit 74 to the conduit 76 from vent port 54. Inlet port 70 is connected by a conduit 78 to the outlet port 50 of casing 48 and the outlet port 68 is connected by conduit 28 to the rearward end of cylinder 24.

With the control devices in the position shown, the inlet pressure for the turbine is not high enough to provide the established pressure ratio between turbine inlet and exhaust pressures and still maintain the necessary exhaust pressure. Control device 34 thus functions merely as a fluid connection between device 32 and the nozzle adjusting piston and cylinder and the nozzle is thus under the control of device 32. If the turbine exhaust pressure decreases or if the total of the ram and the atmospheric pressure increases, the bellows will expand and valve 46 will be moved to the right to vent the end of cylinder 24 and cause further restriction of the nozzle. On the other hand, if the exhaust pressure increases or the total of ram and atmospheric pressure decreases, the bellows will contract and valve 46 will be moved to the left and connect fluid inlet port 52 to outlet port 50 so that fluid under pressure will enter cylinder 24 and increase the nozzle opening.

If the turbine exhaust pressure becomes greater than the total of ram plus atmospheric pressure and continues to stay greater, the control device 32 becomes ineffective, since valve 46 will be moved by this increase in pressure into a position to maintain a fluid connection between inlet port 52 and outlet port 50. Control device 34 then becomes operative and maintains a constant pressure ratio between the inlet and exhaust pressures of the turbine. If the turbine inlet pressure remains constant, the effect of control device 34, under normal operation, will be to maintain a constant back pressure on the turbine.

It is to be understood that the invention is not limited to the specific embodiment herein illustrated and described, but may be used in other ways without departure from its spirit as defined by the following claims.

I claim:

1. A vehicle power plant including a gas turbine, an adjustable nozzle through which gas from the turbine is discharged, and control means for adjusting the nozzle in response to changes in dynamic pressure resulting from motion of the vehicle and in response to changes in turbine exhaust pressure.

2. A vehicle power plant including a gas turbine, an adjustable nozzle through which gas from the turbine is discharged, and control means for adjusting the nozzle in response to changes in atmospheric pressure and in response to changes in turbine exhaust pressure.

3. A vehicle power plant including a gas turbine, an adjustable nozzle through which gas from the turbine is discharged, and control means for adjusting the nozzle to maintain a back pressure on the turbine proportional to the sum of the static atmospheric pressure and the dynamic pressure resulting from the motion of the vehicle.

4. A vehicle power plant including a gas turbine, an adjustable nozzle through which gas from the turbine is discharged, in combination with means for adjusting the nozzle to maintain a back pressure on the turbine proportional to the inlet pressure, and other means, automatically operative at low back pressures for controlling the nozzle to maintain a back pressure as a function of the dynamic pressure resulting from the motion of the vehicle.

5. A vehicle power plant including a gas turbine, an adjustable nozzle through which gas from the turbine is discharged, in combination with means for adjusting the nozzle to maintain a back pressure on the turbine proportional to the inlet pressure, and other means, automatically operative at low back pressures for controlling the nozzle to maintain a back pressure proportional to the sum of the atmospheric pressure and the dynamic pressure resulting from the motion of the vehicle.

6. A vehicle power plant including a gas turbine, an adjustable nozzle through which gas from the turbine is discharged, in combination with means responsive to changes in turbine inlet pressure for maintaining a constant predetermined relation between inlet and exhaust turbine pressures, and other means responsive to changes in ram pressure for maintaining a predetermined relation between ram pressure and turbine exhaust pressure at low turbine exhaust pressure.

7. A vehicle power plant including a gas turbine, propulsion means driven thereby, an adjustable thrust nozzle through which gas from the turbine is discharged as a propulsive jet, and automatic means for adjusting the nozzle in response to changes in pressures at intake and exhaust of the turbine to obtain a selected distribution of energy between the turbine and the thrust nozzle.

8. A vehicle power plant including a gas turbine, propulsion means driven thereby, an adjustable thrust nozzle through which gas from the turbine is discharged, control means for adjusting the nozzle and means associated with said control means for maintaining a selected distribution of energy between the turbine and the thrust nozzle, said control means being actuated by changes in the turbine inlet and exhaust pressures.

9. A vehicle power plant including a gas turbine, and an adjustable propulsive thrust nozzle through which gas from the turbine is discharged, in combination with means responsive to changes in turbine inlet and exhaust pressure for maintaining a constant predetermined relation between inlet and exhaust turbine pressures, and other means responsive to changes in ram and atmospheric pressures for maintaining a predetermined relation between said ram and atmospheric pressures and turbine exhaust pressure.

10. A vehicle power plant including a gas turbine, an adjustable propulsive thrust nozzle through which gas from the turbine is discharged, means responsive to changes in the exhaust pressure for adjusting the nozzle, and means responsive to forward speed of the vehicle and associated with said first means for maintaining a constant back pressure in the turbine.

DAVID M. POOLE.

REFERENCES CITED

The following references are of record in the file of this patent:

UNITED STATES PATENTS

| Number | Name | Date |
|---|---|---|
| 872,377 | Samuelson | Dec. 3, 1907 |
| 1,020,684 | Crissey | Mar. 19, 1912 |
| 1,777,470 | Marsland | Oct. 7, 1930 |
| 1,904,475 | Kissing | Apr. 18, 1933 |
| 1,905,760 | Standerwick | Apr. 25, 1933 |
| 2,280,835 | Lysholm | Apr. 28, 1942 |
| 2,342,262 | Franz et al. | Feb. 22, 1944 |

FOREIGN PATENTS

| Number | Country | Date |
|---|---|---|
| 295,515 | Germany | July 30, 1917 |